United States Patent
Dai et al.

(10) Patent No.: US 8,750,385 B2
(45) Date of Patent: Jun. 10, 2014

(54) VIDEO DATA LOSS RECOVERY USING LOW BIT RATE STREAM IN AN IPTV SYSTEM

(75) Inventors: Jiwang Dai, Princeton Junction, NJ (US); John Qiang Li, Montgomery, NJ (US); Alan Jay Stein, Princeton Junction, NJ (US)

(73) Assignee: Thomson Research Funding, Indianapolis, IN (US)

( * ) Notice: Subject to any disclaimer, the term of this patent is extended or adjusted under 35 U.S.C. 154(b) by 397 days.

(21) Appl. No.: 12/448,291

(22) PCT Filed: Dec. 20, 2006

(86) PCT No.: PCT/US2006/048632
§ 371 (c)(1),
(2), (4) Date: Jun. 16, 2009

(87) PCT Pub. No.: WO2008/088305
PCT Pub. Date: Jul. 24, 2008

(65) Prior Publication Data
US 2010/0046634 A1 Feb. 25, 2010

(51) Int. Cl.
*H04N 11/04* (2006.01)

(52) U.S. Cl.
USPC ............ 375/240.25; 375/240.26; 375/240.27; 375/240.28

(58) Field of Classification Search
None
See application file for complete search history.

(56) References Cited

U.S. PATENT DOCUMENTS

| 5,629,736 | A | * | 5/1997 | Haskell et al. | ............ 348/386.1 |
| 5,694,173 | A | * | 12/1997 | Kimura et al. | ............ 348/423.1 |
| 6,577,762 | B1 | * | 6/2003 | Seeger et al. | ................ 382/173 |
| 6,731,811 | B1 | * | 5/2004 | Rose | ............................ 382/238 |

(Continued)

FOREIGN PATENT DOCUMENTS

| EP | 1487215 | 12/2004 |
| JP | 2001333394 A | 11/2001 |

(Continued)

OTHER PUBLICATIONS

Vilei et al., "A Novel Unbalanced Multiple Description Scheme for Video Transmission over WLAN," XP-002490451, WMASH'05, Sep. 2, 2005, Cologne, Germany.

(Continued)

*Primary Examiner* — Joseph Ustaris
*Assistant Examiner* — Frederick Bailey
(74) *Attorney, Agent, or Firm* — Robert D. Shedd; Jerome G. Schaefer (57) ABSTRACT

A system and method for recovering from data loss are described including monitoring a first bit rate video data bit stream to determine if there is frame loss or damage, multiplexing decoding parameters of a second bit rate video data bit stream, the second bit rate video data bit stream and the first bit rate video data bit stream, if there is frame loss or damage, demultiplexing the first bit rate video data bit stream and the second bit rate video data bit stream, decoding the first bit rate video data bit stream, removing damaged frames from the first bit rate video data bit stream, decoding the second bit rate video data bit stream, up-sampling frames from said processed second bit rate video data bit stream if said processed second bit rate video data bit stream has a lower resolution than said processed first bit rate video data bit stream and merging frames from the second bit rate video data bit stream and the first bit rate video data bit stream.

24 Claims, 6 Drawing Sheets

(56) References Cited

U.S. PATENT DOCUMENTS

| | | | |
|---|---|---|---|
| 6,917,652 B2 * | 7/2005 | Lyu | 375/240.25 |
| 7,676,722 B2 * | 3/2010 | Setton et al. | 714/748 |
| 7,870,465 B2 * | 1/2011 | VerSteeg | 714/774 |
| 2004/0218673 A1 * | 11/2004 | Wang et al. | 375/240.12 |
| 2006/0013313 A1 * | 1/2006 | Han et al. | 375/240.21 |
| 2007/0039028 A1 * | 2/2007 | Bar | 725/95 |
| 2007/0091997 A1 * | 4/2007 | Fogg et al. | 375/240.1 |
| 2007/0286283 A1 * | 12/2007 | Yin et al. | 375/240.16 |
| 2008/0288458 A1 * | 11/2008 | Sun et al. | 707/3 |
| 2010/0315561 A1 * | 12/2010 | Cooper et al. | 348/726 |

FOREIGN PATENT DOCUMENTS

| | | |
|---|---|---|
| JP | 2005033556 A | 2/2005 |
| JP | 2005051707 A | 2/2005 |
| WO | 0078000 A2 | 12/2000 |
| WO | 2004114668 A1 | 12/2004 |
| WO | 2005112465 A1 | 11/2005 |
| WO | 2006019481 A2 | 2/2006 |

OTHER PUBLICATIONS

Radoslavov et al., "A Comparison of Application-Level and Router-Assisted Hierarchical Schemes for Reliable Multicast," USC/Information Sciences Institute, 2001 IEEE.

Chou et al., "FEC and Pseudo-ARQ for Receiver-driven Layered Multicast of Audio and Video," Microsoft Corporation, 2000 IEEE.

Int'l Search Report dated Aug. 11, 2008.

* cited by examiner a. VIDEO PACKET MULTICAST IN THE IPTV MULTICAST NETWORK

PRIOR ART

FIG. 1A b. VIDEO PACKET LOSS PROPAGATION IN THE IPTV MULTICAST NETWORK

LEGEND: ▨ GOOD PACKETS
▯ LOST PACKETS

PRIOR ART

VIDEO DATA LOSS RECOVERY USING LOW BIT RATE STREAM IN AN IPTV SYSTEM

GOVERNMENT LICENSE RIGHTS

The U.S. Government has a paid-up license in this invention and the right in limited circumstances to require the patent owner to license others on reasonable terms as provided for by the terms of contract No. 70NANB3H3053 awarded by the National Institute of Standards and Technology.

This application claims the benefit, under 35 U.S.C. §365 of International Application PCT/US2006/048632 filed Dec. 20, 2006, which was published in accordance with PCT Article 21(2) on Jul. 24, 2008.

FIELD OF THE INVENTION

The present invention relates to internet protocol television (IPTV) in general and in particular, to the use of a low bit rate bit stream to recover from video data loss in an IPTV system.

BACKGROUND OF THE INVENTION

Advanced video coders-decoders (CODECs), such as motion picture experts group (MPEG2) or H.264 advanced video coding (AVC), uses intra-coded and inter-coded predication to achieve a high compression rate. An inter-coded picture uses information from other pictures for compression. Therefore, the packet/frame loss in a compressed picture will not only degrade the quality of the picture itself, but also affect the quality of all pictures that use this picture as a reference for the inter-coded prediction. For example, a packet loss of an I frame could potentially have adverse effects on all pictures in that group of pictures (GOP).

Figure 1A:
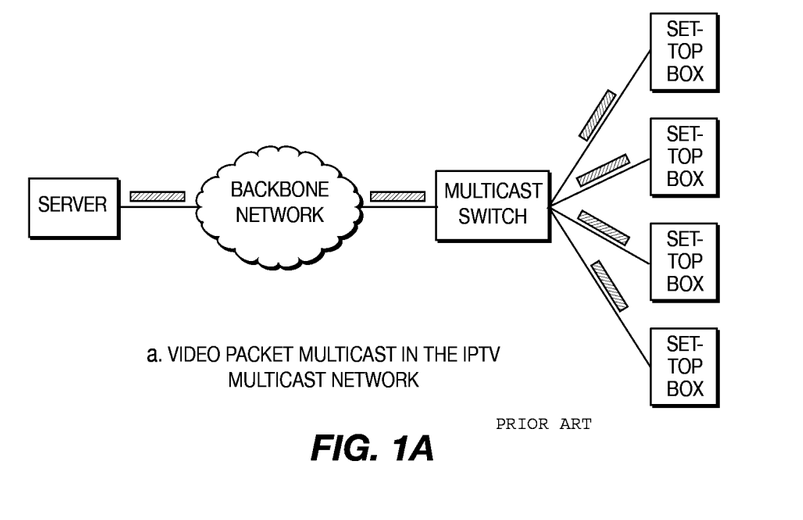
FIG. 1 is a schematic diagram of a conventional multicast IPTV system.
Figure 1B:
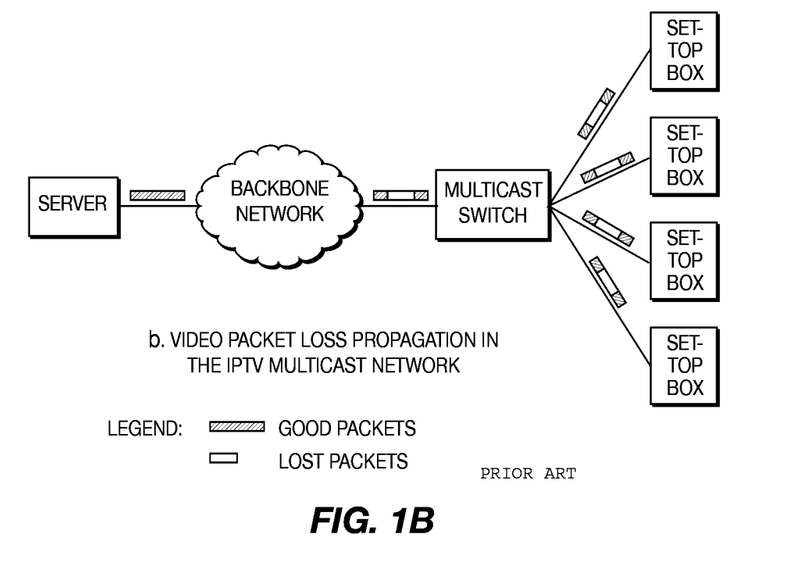

In a commercial digital TV broadcast system, video data streams are sent from head-end streaming servers through a backbone network to a number of multicast switches, from which video data streams are multicast to multiple residential set-top boxes as shown in FIG. 1a. The data integrity in the backbone transport is of high importance. Any packet loss in the backbone transport will propagate to all the downstream set-top boxes as shown in FIG. 1b.

In real-time streaming, user datagram protocol (UDP) is often used to transport streams. UDP by itself does not guarantee the quality of service. To offer high quality of commercial video services (e.g. 99.999% of the time without errors), the packet loss rate should be very low (less than 1×10E-6) in the backbone network, far less than the packet loss rate of 1×10E-3 defined in the class 0 network service (best) in ITU Y.1541. Forward error correction (FEC) or a selective re-transmission technique can significantly decrease the effective packet loss rate. But in a real system, packet loss could still occur for various reasons.

When packet loss does occur, it is important to reduce the subjective video artifacts presented to the end users. An error concealment technique is normally used for that purpose. Error concealment techniques utilize information from either temporal or spatial neighbors to conceal the errors in the corrupted regions or frames. However, error concealment generally does not have good performance when lost packets include reference frames (I or P) data or when a large number of consecutive frames are entirely lost.

Previous efforts have been made to reduce the packet loss rate in the multicast backbone network. FEC is a practical way to significantly increase the quality of service (QoS). Some recent studies have focused on improving FEC algorithms. However, strong FEC often demands high computation power and introduces significant additional latency in the video data stream transport, whereas weak FEC often does not have adequate performance for a prolonged outage (e.g. >2 seconds). Adaptive FEC uses two way communications to dynamically adjust the strength of the FEC, but the complexity of the system is much higher.

Some IPTV systems (e.g. maximum service television (MSTV)) use re-transmission to perform loss recovery. There are two types of multicast data loss recovery schemes, namely source-based and distributed recovery. The distributed multicast data loss recovery schemes usually outperform source-based video data loss recovery schemes in efficiency and recovery latency, both of which are essential for large-scale video multicast. But the distributed loss recovery schemes require active loss recovery components deployed at multiple nodes at different levels of the hierarchical network topology. The source-based recovery scheme is easier to implement and requires fewer active components in the network, but it is less efficient especially in a large scale deployment. Also, the server could be flooded by large number of re-transmission requests, namely the negative acknowledgment (NAK) implosion problem.

Some commercial systems that demand stringent QoS level use redundant paths for the backbone transport; one is used for the primary path and the other is used as a backup path. Such a system has very high reliability but the cost in terms of network transport is almost doubled.

The present invention addresses the above problems.

SUMMARY OF THE INVENTION

In the present invention, the video data frames are encoded into a low bit rate and a regular/normal bit rate video data bit stream. As used herein, a "/" is used to indicate alternative names for the same component or concept. These two streams are transferred by a video server through a backbone network in two separate multicast groups to a proxy server, which connects to one or more multicast switches, from which the video data bit streams are then selectively multicast to multiple video terminals (e.g. set-top boxes). Under normal conditions, the low bit rate video data bit stream does not consume any bandwidth of the path connecting between the multicast switches and the set-top boxes.

The proxy server monitors the packet loss of the regular video data bit stream. If a packet loss event is detected, the proxy server multiplexes the decoding parameters of the low bit rate video data bit stream (e.g. sequence parameter set (SPS) and picture parameter set (PPS)) and the low bit rate video data bit stream that corresponds to the missing portion of the regular bit rate video data bit stream into the multicast group of the regular video data bit stream. The receiving set-top box then de-multiplexes the low bit rate and the regular bit rate video data bit streams and uses the frames decoded from the low bit rate video data bit stream to conceal the lost or damaged frames in the regular bit rate video data bit stream. The same low bit rate video data bit stream can be used for fast channel change and picture-in-picture or mosaic view. The mosaic view is like a thumbnail of photos. It displays multiple (e.g., 12) channels of video simultaneously on one screen.

A system and method for recovering from data loss are described including monitoring a first bit rate video data bit stream to determine if there is frame loss or damage, multiplexing decoding parameters of a second bit rate video data bit stream, the second bit rate video data bit stream and the first bit rate video data bit stream, if there is frame loss or damage, demultiplexing the first bit rate video data bit stream and the second bit rate video data bit stream, decoding the first bit rate video data bit stream, removing damaged frames from the first bit rate video data bit stream, decoding the second bit rate video data bit stream, up-sampling frames from said processed second bit rate video data bit stream if said processed second bit rate video data bit stream has a lower resolution than said processed first bit rate video data bit stream and merging frames from the second bit rate video data bit stream and the first bit rate video data bit stream.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 2A:
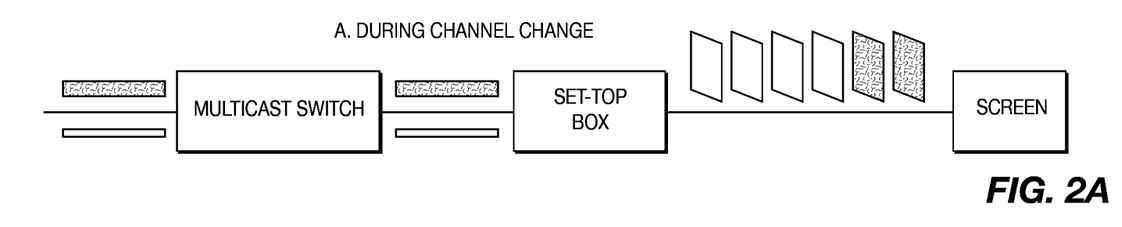
FIG. 2 is an example of a low bit rate video data bit stream used for fast channel changes.
Figure 2B:
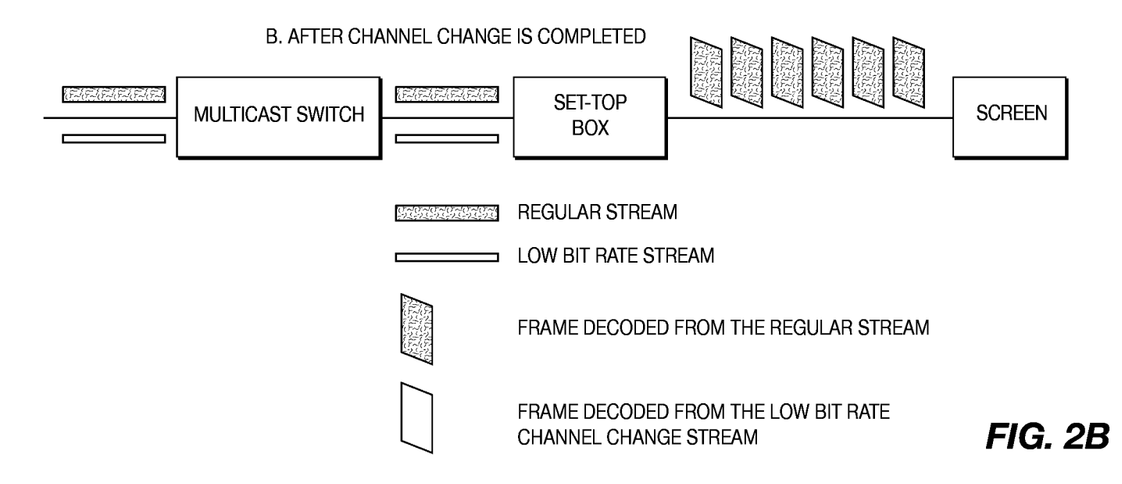

In the present invention, a low bit rate (e.g. 200 Kbps) and short GOP size (e.g. 0.5 sec) video data stream is encoded and transported along with the regular video data stream. The low bit rate video stream many have a lower resolution (e.g. CIF) or the same resolution but lower video quality compared to the regular video stream. FIG. 2A shows the transport of the regular video data bit stream and the low bit rate video data bit stream during a channel change and FIG. 2B shows the transport of the regular video data bit steam after the channels change (no low bit rate video data bit stream along the transport). Also shown in FIG. 2A are the frames decoded from the low bit rate video data bit stream that are displayed. The transport of the regular and low video data bit rate streams can either be simulcast with zero time-shift or staggercast with a fixed or configurable time distance (e.g. 2 seconds). Staggercasting minimizes the likelihood that one network glitch causes packet losses in both streams at the same media time and, therefore, is the preferred method. In the staggercast scenario, the low bit rate video data bit rate stream can either lead or lag the regular stream by a time distance (for example, 2 seconds).

Under normal conditions, the two video data bit streams are sent to two different multicast groups so that each video data bit stream can be independently joined and used or unused by end-users. This reduces the bandwidth in the last segment of the network, which is between the multicast switch and the set-top box. In a digital subscriber line (DSL) deployment, the last segment is the local loop between the DSL access multiplexer (DSLAM) and the set-top box, which is often the bandwidth bottleneck in the IPTV system. Therefore, it is important to reduce the usage of DSLAM bandwidth.

An advantage of the present invention is that the low bit rate video data bit stream can be used for picture in picture (PIP) display or fast channel change. In those applications, the low bit rate video data bit stream is only cast to the STB when it is requested by the STB. FIG. 2 shows streaming in the channel change application.

Figure 3:
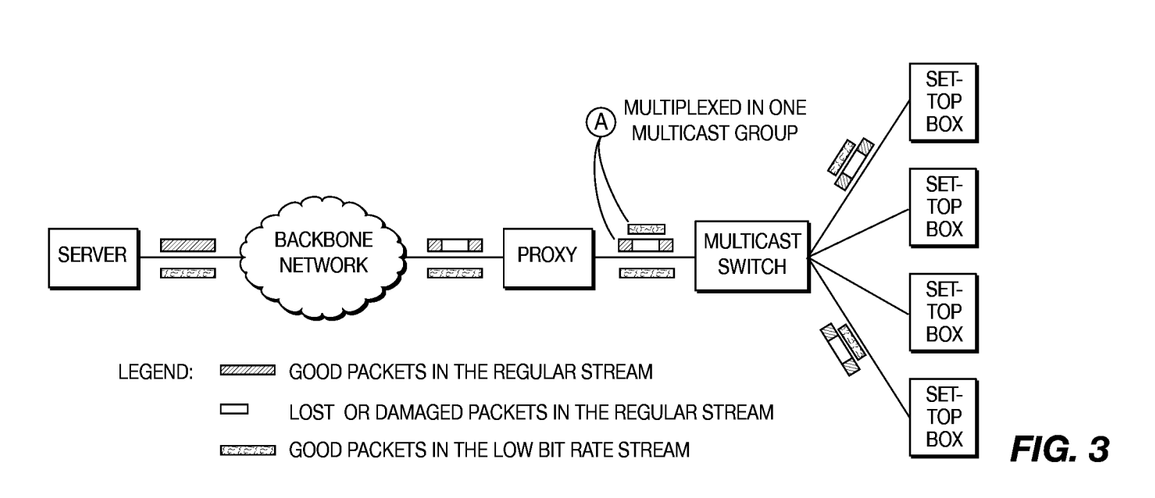
FIG. 3 is a schematic diagram of a low bit rate bit stream used to recover data loss in the normal (regular) bit rate video data bit stream.

The present invention provides a proxy server residing between the backbone network and the multicast switch. Both the regular bit rate video data bit stream and low bit rate video data bit stream are received and buffered/stored (memory storage device) for a certain time period (e.g. 5 seconds) by the proxy server. The decoding parameters (e.g. SPS, PPS for H.264 streams) are also stored in the proxy server. The proxy server monitors the regular bit rate video data bit stream for any packet loss (QOS). If it detects a packet loss or damaged packet, the proxy server will first determine the media presentation timestamp that corresponds to the beginning of the video deterioration event (Tb). In a video encoding that does not allow B pictures, such as H.264 baseline profile encoding, Tb is the media presentation time of the last received good frame. In a video encoding that has B pictures, Tb is the media presentation time of the last received good B frame if it is encoded as open GOP or the last received good B or I frame if it is encoded as closed GOP. The timestamp Tb marks the beginning of the packet loss event. The proxy server then searches the low bit rate video data bit stream stored in its local buffer and the incoming stream for the I frame whose timestamp is just before Tb. The buffer size in the proxy server is designed so that this I frame can be found in most cases. After that, the proxy server sends the decoding parameters of the low bit rate video data bit stream and then relays the low bit rate video data bit stream starting from that I frame into the multicast group of the regular bit rate video data bit stream as a different program, as shown in FIG. 3. It should be noted that the "patching" low bit rate video data bit stream packets are not integrated with the regular bit rate video data bit stream, but are transferred as a separated stream within the regular bit rate video data bit stream multicast transport group. The actual merging of the "patching" low bit rate video data bit stream into the regular bit rate video data bit stream is performed at the set-top boxes.

The proxy server then searches for the end of video deterioration event. The presentation timestamp that corresponds to the end of video deterioration event is recorded as Te by the proxy server. The proxy server transfers all low bit rate video data bit stream packets until it detects a low bit rate I frame whose presentation timestamp is just larger than Te. This ensures that all low bit rate video data bit stream packets whose presentation timestamp is less than Te are transferred by the proxy server and, therefore, the multiplexed low bit rate video data bit stream packets cover the entire lost portion of the regular bit rate video data bit stream.

Figure 4:
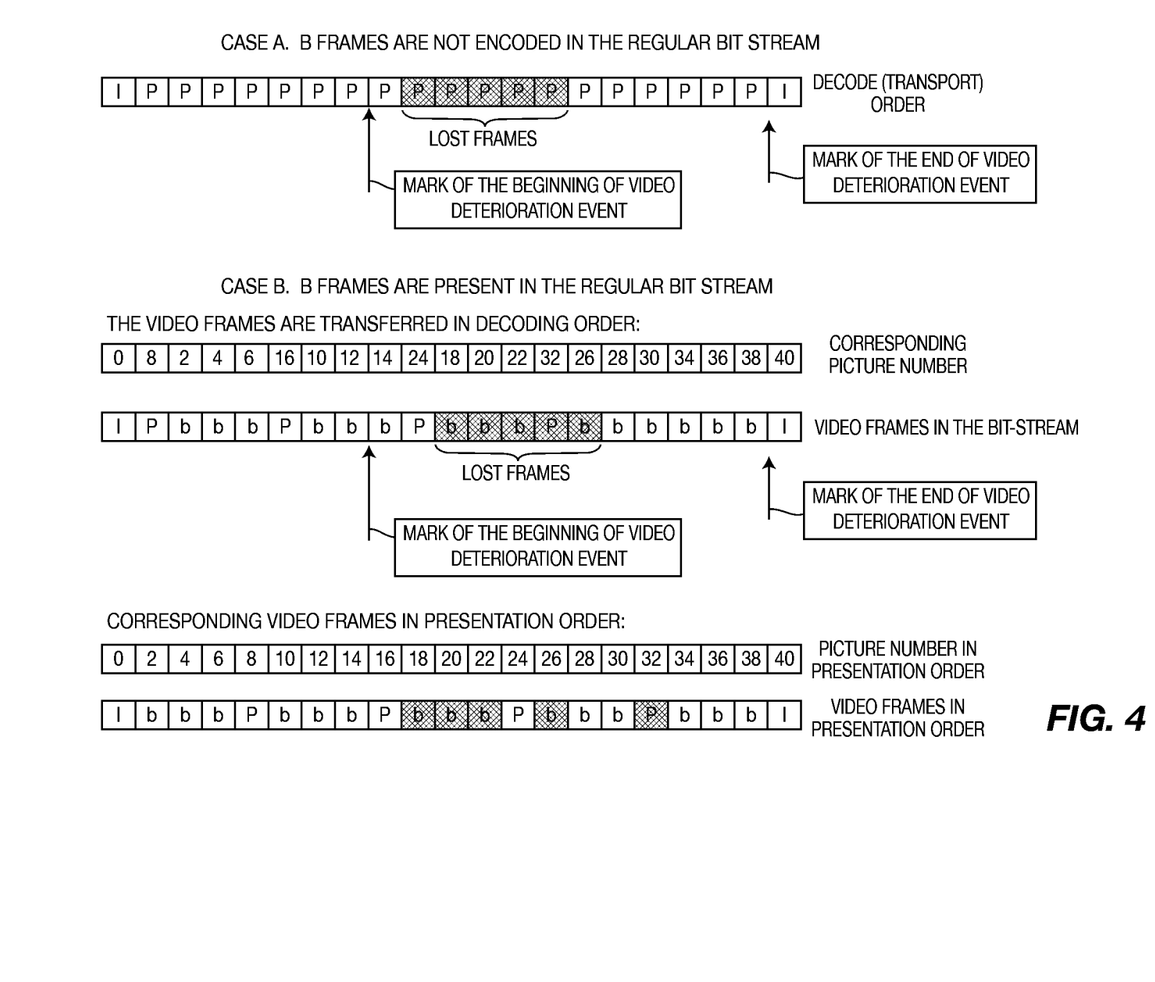
FIG. 4 illustrates marking the beginning and the end of the video/data deterioration event.

The end of packet loss generally does not mean the end of video deterioration. This is because that the lost or damaged picture may be used as the reference picture by the following pictures. In general, the next received good I frame (for MPEG2 and H.264) or intermediate data rate (IDR) frame (for H.264) in the regular bit rate video data bit stream is regarded as the end of video deterioration event. FIG. 4 illustrates the end of video deterioration timestamp. Specifically, in case A, B frames are not encoded in the regular bit rate video data bit stream and the beginning of the video deterioration event Tb is marked just before the P frame immediately preceding the identified lost P frames. Correspondingly, the end of the video deterioration event Te is marked just before the next I frame.

In case B, B frames are present in the regular bit rate video data bit stream. The video frames are transferred in decoding order. The lost regular bit rate video data bit stream frames are 18, 20, 22, 32 and 26, which are consecutive in decoding order. The beginning of the video deterioration event Tb is marked just before the B frame immediately preceding the identified lost P frames. Correspondingly, the end of the video deterioration event Te is marked just before the next I frame. The video frames are presented in numerical order with the low bit rate frames embedded in the presentation order display with the low bit rate video data bit stream frames not in consecutive order in the decoding order.

Figure 5:
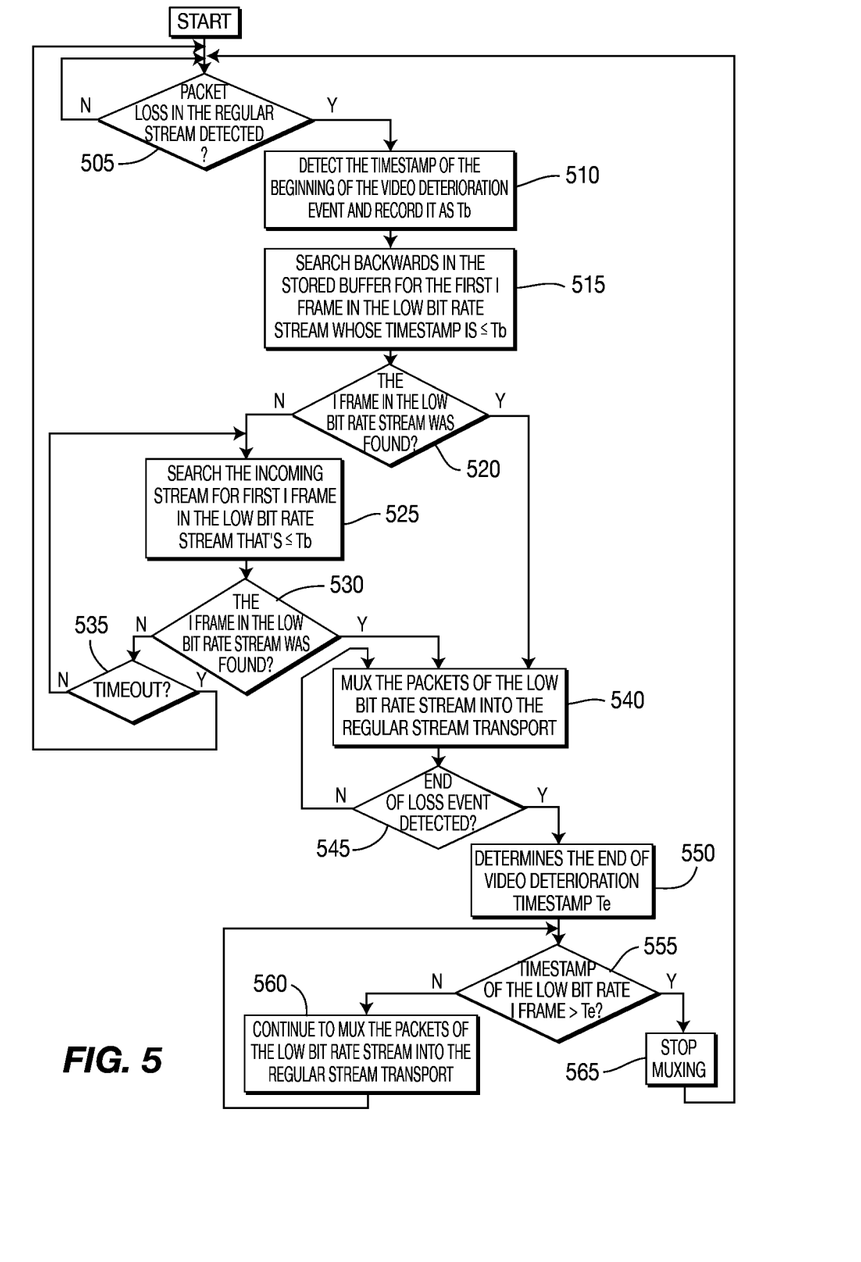
FIG. 5 is a flowchart of the loss detection method performed by the proxy server.

FIG. 5 is a flowchart of the loss detection method performed of frames of the regular bit rate video data bit stream by the proxy server. Once the lost frames are detected and the video deterioration event is marked (Tb, Te) then the low bit rate video data bit stream frames are multiplexed into the regular bit rate video data bit stream. At 505, a test is performed to determine if packet/frame loss has been detected. If no packet/frame loss has been detected then this act is repeated. If packet/frame loss has been detected then a 510, the beginning of the video deterioration event Tb is marked and recorded. At 515, a backwards search is performed. The backwards search looks in the buffer for the first I frame in the low bit rate video data bit stream with a timestamp less than or equal to Tb. At 520, a test is performed if the I frame in the low bit rate video data bit stream was located. If the I frame was not located then the incoming low bit rate video data bit stream is searched for the first I frame less than or equal to Tb at 525. At 530, a test is performed to determine if the I frame in the low bit rate video data bit stream was located. If the I frame was not located then a test is performed at 535 to determine if there has been a timeout. If there has not been a timeout yet, then the test at 525 is repeated. If there has been a timeout then act 505 is repeated. If the low bit rate video data bit stream I frame was located at act 520, then the low bit rate video data bit stream frames are multiplexed into the regular bit rate video data bit stream at 540. At 545, a test is performed to determine if the end of video deterioration loss has been detected. If the end of video deterioration loss has not been detected then at 540 is repeated. If the end of video deterioration loss has been detected then a determination is made at 550 of the end of video deterioration loss timestamp Te. A test is performed at 555 to determine if the timestamp of the last low bit rate video data bit stream I frame is greater than Te. If the timestamp is not greater than Te then continue to multiplex the packets of the low bit rate video data bit stream into the regular bit rate video data bit stream at 560. If the timestamp is greater than Te, then stop multiplexing and repeat act 505.

Figure 6:
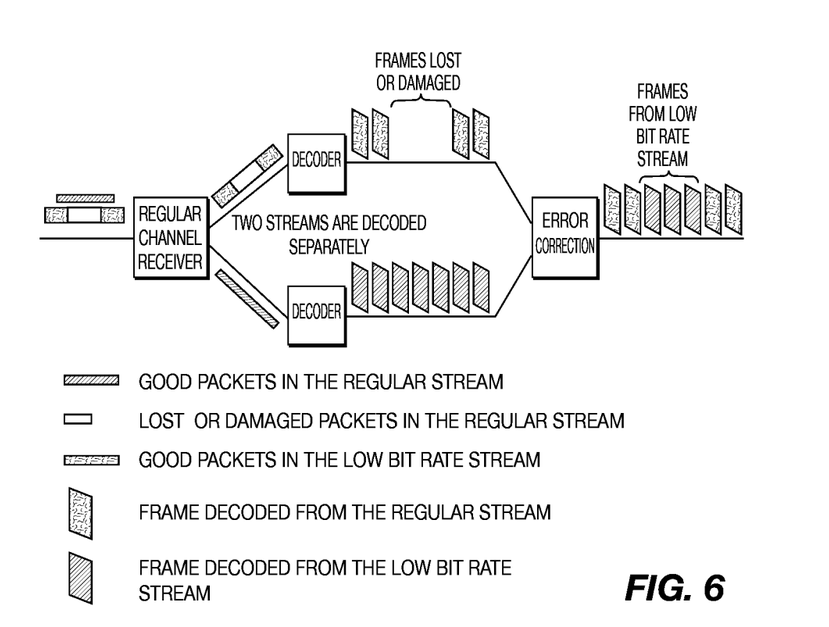
FIG. 6 is a detailed schematic diagram of a set top box that performs stream receiving, de-multiplexing, decoding and frame recovery.

The multiplexing of the low bit rate video data bit stream into the regular bit rate video data bit stream multicast group is important. This allows STBs to receive the low bit rate video data bit stream without actively requesting for it. Otherwise, the multicast join command (e.g. internet group management protocol (IGMP) join) would have to be sent by the STB to receive the low bit rate video data bit stream. The packet loss event would trigger all the STB's tuned to that program to simultaneously send the multicast join commands to the multicast switch, which could be flooded by these commands. In the present invention, the STBs only receive data from regular channel. The proxy server actively relays the low bit rate video data bit stream to the regular channel along with the regular bit rate video data bit stream (but as a different program) when a loss or damage in the regular bit rate video data bit stream is detected. STBs receive both programs from the regular channel and de-multiplex into two programs based on the program number and then decode them separately, as shown in FIG. 6. The decoder for the regular bit rate video data bit stream decodes the video stream and eliminates the damaged video frames. The error correction module merges the decoded low bit rate video data bit stream frames into the decoded regular bit rate video data bit stream. If the low bit rate video data bit stream has a lower resolution than the regular bit rate video data bit stream, the error correction module also performs up-sampling to the decoded low bit rate video data bit stream frames so that they have the same resolution as the decoded regular bit rate video data bit stream frames.

Figure 7:
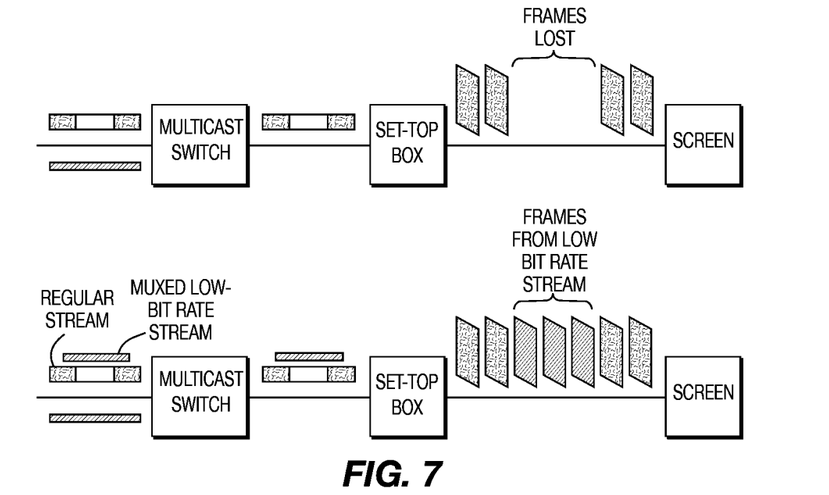
FIG. 7 is a detailed schematic diagram comparing conventional data recovery and video recovery in accordance with the present invention.

FIG. 7 is a detailed schematic diagram of the use of the low bit rate video data bit stream used to recover data lost in the regular bit rate video data bit stream. Specifically, FIG. 7 is a comparison between the prior art and the present invention. The decoded low bit rate video data bit stream frames are up-sampled to the same resolution of the regular bit rate video data bit stream if the low bit rate video data bit stream has a lower resolution than the regular bit rate video data bit stream, and used to replace or repair the lost or damaged frames in the regular bit rate video data bit stream, as shown in FIG. 7. The replaced or repaired frames are then sent to the display device. In the prior art the data loss causes frame loss in the regular bit rate video data bit stream. In the present invention, the data loss is recovered by replacing the lost frames in the regular bit rate video data bit stream with low bit rate video data frames.

The advantage of using the low bit rate video data bit stream frame rather than FEC, parity or spatial scalable video coding as the redundant data is that the same low bit rate video data bit stream can be used for picture in picture, mosaic view or fast channel change stream.

It is important that the replacement of damaged or lost frames of the regular bit rate video data bit stream is performed after decoding. Therefore, the present does not have to interrupt the decoding process of either stream. Also, it is capable of replacing a single frame of regular bit rate video data bit stream without changing other frames in the same GOP.

Figure 8:
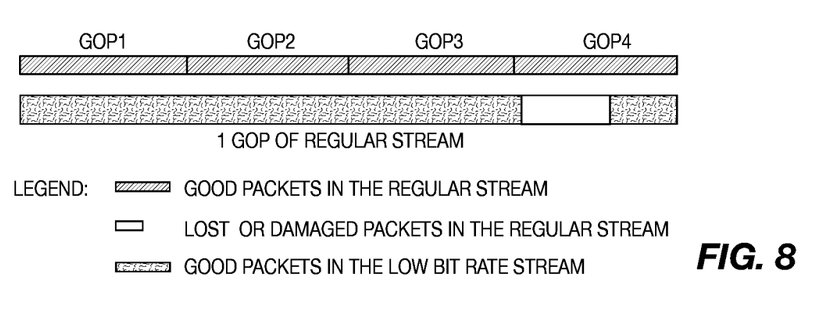
FIG. 8 illustrates the advantage of using a shorter group of pictures low bit rate bit stream.

It is also important that the GOP size of the low bit rate video data bit stream is shorter than the size of the regular stream. When a portion of the regular bit rate video data bit stream is lost or damaged, the proxy server only has to relay the corresponding GOPs of the low bit rate video data bit stream to the STB. FIG. 4 case A shows that when B frames are not present, the duration of the video deterioration event can be shorter than the GOP size of the regular bit rate video data bit stream. Therefore, "patching" of the low bit rate video data bit stream frames that need to cover the deterioration period can be shorter than the GOP size of the regular bit rate video data bit stream. This is shown in FIG. 8, where the portion of the regular bit rate video data bit stream that is damaged is not colored/shaded. Only GOP4 of the low bit rate video data bit stream is needed for error recovery.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for recovering from data loss in a multicast internet protocol television system, said method comprising:
 monitoring a first bit rate video data bit stream to determine if there is one of frame loss and damage by a proxy server;
 multiplexing decoding parameters of a second bit rate video data bit stream, said second bit rate video data bit stream and said first bit rate video data bit stream, if there is one of frame loss and damage, wherein said second bit rate video data bit stream has a lower bit rate than said first bit rate video data bit stream by said proxy server;
 demultiplexing said first bit rate video data bit stream, said second bit rate video data bit stream and said decoding parameters of said second bit rate video data bit stream by a receiving set top box;
 decoding said first bit rate video data bit stream to generate a processed first bit rate video data bit stream by said receiving set top box;
 removing damaged frames from said processed first bit rate video data bit stream by said receiving set top box;
 decoding said second bit rate video data bit stream using said received decoding parameters to generate a processed second bit rate video data stream, wherein said processed second bit rate video data bit stream has a lower bit rate than said processed first bit rate video data bit stream, by said receiving set top box;
 up-sampling decoded frames from said processed second bit rate video data bit stream if said processed second bit rate video data bit stream has a lower resolution than said processed first bit rate video data bit stream by said receiving set top box; and
 merging the decoded and up-sampled frames from said processed second bit rate video data bit stream and said processed first bit rate video data bit stream by said receiving set top box to one of replace and repair one of said lost and damaged frames of said first bit rate video data bit stream.

2. The method according to claim 1, wherein said first bit rate video data bit stream and said second bit rate video data bit stream are simulcast to said proxy server.

3. The method according to claim 1, wherein said first bit rate video data bit stream and said second bit rate video data bit stream are staggercast to said proxy server.

4. The method according to claim 1, further comprising:
 transmitting said first bit rate video data bit stream to a first multicast group; and
 transmitting said second bit rate video data bit stream to a second multicast group.

5. The method according to claim 1, wherein said second bit rate video data bit stream is used to accomplish a fast channel change.

6. The method according to claim 1, wherein said second bit rate video data bit stream is used for picture-in-picture.

7. The method according to claim 1, wherein said second bit rate video data bit stream is used for mosaic view.

8. The method according to claim 1, further comprising:
 determining a beginning of a video deterioration event; and
 determining an end of said video deterioration event.

9. The method according to claim 8, further comprising:
 searching backwards in a memory storage element and forward in an incoming second bit rate video data bit stream to locate a first I frame before said beginning of said video deterioration event; and
 searching in one of said memory storage element and said incoming second bit rate video data bit stream for a first I frame after said end of said video deterioration event.

10. The method according to claim 9, wherein said multiplexing act selectively multiplexes a group of pictures of said second bit rate video data bit stream corresponding to one of said lost and damaged frames of said first bit rate video data bit stream.

11. The method according to claim 10, wherein a resolution of said group of pictures of said second bit rate video data bit stream is one of equal to and less than a resolution of said group of pictures of said first bit rate video data bit stream.

12. A method for recovering from data loss at a receiver in a multicast internet protocol television system, said method comprising:
 receiving a multiplexed video data bit stream in a multicast group, said multiplexed video data bit stream including a first bit rate video data bit stream, a second bit rate video data bit stream and decoding parameters of said second bit rate video data bit stream;
 de-multiplexing said received video data bit stream into a first bit rate video data bit stream and a second bit rate video data bit stream, said second bit rate video data bit stream comprising frames corresponding to one of lost and damaged frames of said first bit rate video data bit stream, wherein said second bit rate video data bit stream has a lower bit rate than said first bit rate video data bit stream;
 decoding frames from said second bit rate video data bit stream using said received decoding parameters of said second bit rate video data bit stream to one of replace and repair one of said lost and damaged frames of said first bit rate video data bit stream;
 up-sampling the decoded frames from said processed second bit rate video data bit stream to one of replace and repair one of said lost and damaged frames of said first bit rate video data bit stream if said processed second bit rate video data bit stream has a lower resolution than said processed first bit rate video data bit stream by said receiving set top box; and
 merging the decoded and up-sampled frames from said processed second bit rate video data bit stream and said processed first bit rate video data bit stream by said receiving set top box to recover one of lost and damaged data in said processed first bit rate video data bit stream.

13. A system for recovering from data loss in a multicast internet protocol television system, comprising:
 a proxy server for monitoring a first bit rate video data bit stream to determine if there is one of frame loss and damage;

said proxy server multiplexing decoding parameters of a second bit rate video data bit stream, said second bit rate video data bit stream and said first bit rate video data bit stream, if there is one of frame loss and damage, wherein said second bit rate video data bit stream has a lower bit rate than said first bit rate video data bit stream;

a receiving set top box for demultiplexing said first bit rate video data bit stream and said second bit rate video data bit stream;

said receiving set top box decoding said first bit rate video data bit stream to generate a processed first bit rate video data stream;

said receiving set top box removing damaged frames from said processed first bit rate video data stream;

said receiving set top box up-sampling frames from said processed second bit rate video data bit stream if said processed second bit rate video data bit stream has a lower resolution than said processed first bit rate video data bit stream; and said receiving set top box merging frames from said processed second bit rate video data stream and said processed first bit rate video data stream to one of replace and repair the removed damaged frames of said first bit rate video data bit stream.

14. The system according to claim 13, wherein said first bit rate video data bit stream and said second bit rate video data bit stream are simulcast to said proxy server.

15. The system according to claim 13, wherein said first bit rate video data bit stream and said second bit rate video data bit stream are staggercast to said proxy server.

16. The system according to claim 13, further comprising:
a multicast switch for transmitting said first bit rate video data bit stream to a first multicast group; and
said multicast switch transmitting said second bit rate video data bit stream to a second multicast group.

17. The system according to claim 13, wherein said second bit rate video data bit stream is used to accomplish a fast channel change.

18. The system according to claim 13, wherein said second bit rate video data bit stream is used for picture-in-picture.

19. The system according to claim 13, wherein said second bit rate video data bit stream is used for mosaic view.

20. The system according to claim 13, further comprising:
said proxy server determining a beginning of a video deterioration event; and
said proxy server determining an end of said video deterioration event.

21. The system according to claim 20, further comprising:
said proxy server searching backwards in a memory storage element and forward in an incoming second bit rate video data bit stream to locate a first I frame before said beginning of said video deterioration event; and
said proxy server searching in one of said memory storage element and said incoming second bit rate video data bit stream for a first I frame after said end of said video deterioration event.

22. The system according to claim 21, wherein said proxy server selectively multiplexes a group of pictures of said second bit rate video data bit stream corresponding to one of said lost and damaged frames of said first bit rate video data bit stream.

23. The system according to claim 22, wherein a resolution of said group of pictures of said second bit rate video data bit stream is one of less than and equal to a resolution of said group of pictures of said first bit rate video data bit stream.

24. An apparatus for recovering from data loss at a receiver in a multicast internet protocol television system, comprising:
said receiver receiving a multiplexed video data bit stream in a multicast group, said multiplexed video data bit stream including a first bit rate video data bit stream, a second bit rate video data bit stream and decoding parameters of said second bit rate video data bit stream;
said receiver de-multiplexing said received video data bit stream into a first bit rate video data bit stream and a second bit rate video data bit stream, said second bit rate video data bit stream comprising frames corresponding to lost or damaged frames of said first bit rate video data bit stream, wherein said second bit rate video data bit stream has a lower bit rate than said first bit rate video data bit stream;
said receiver decoding frames from said second bit rate video data bit stream using said received decoding parameters of said second bit rate video data bit stream to replace one of said lost and damaged frames of said first bit rate video data bit stream;
up-sampling the decoded frames from said processed second bit rate video data bit stream to one of replace and repair one of said lost and damaged frames of said first bit rate video data bit stream if said processed second bit rate video data bit stream has a lower resolution than said processed first bit rate video data bit stream by said receiving set top box; and
merging the decoded and up-sampled frames from said processed second bit rate video data bit stream and said processed first bit rate video data bit stream by said receiving set top box to recover one of lost and damaged data in said processed first bit rate video data bit stream.

* * * * *